Aug. 8, 1944.  T. N. ADLAM  2,355,043
THERMOSTATICALLY CONTROLLED VALVE
Filed April 13, 1942   2 Sheets-Sheet 1
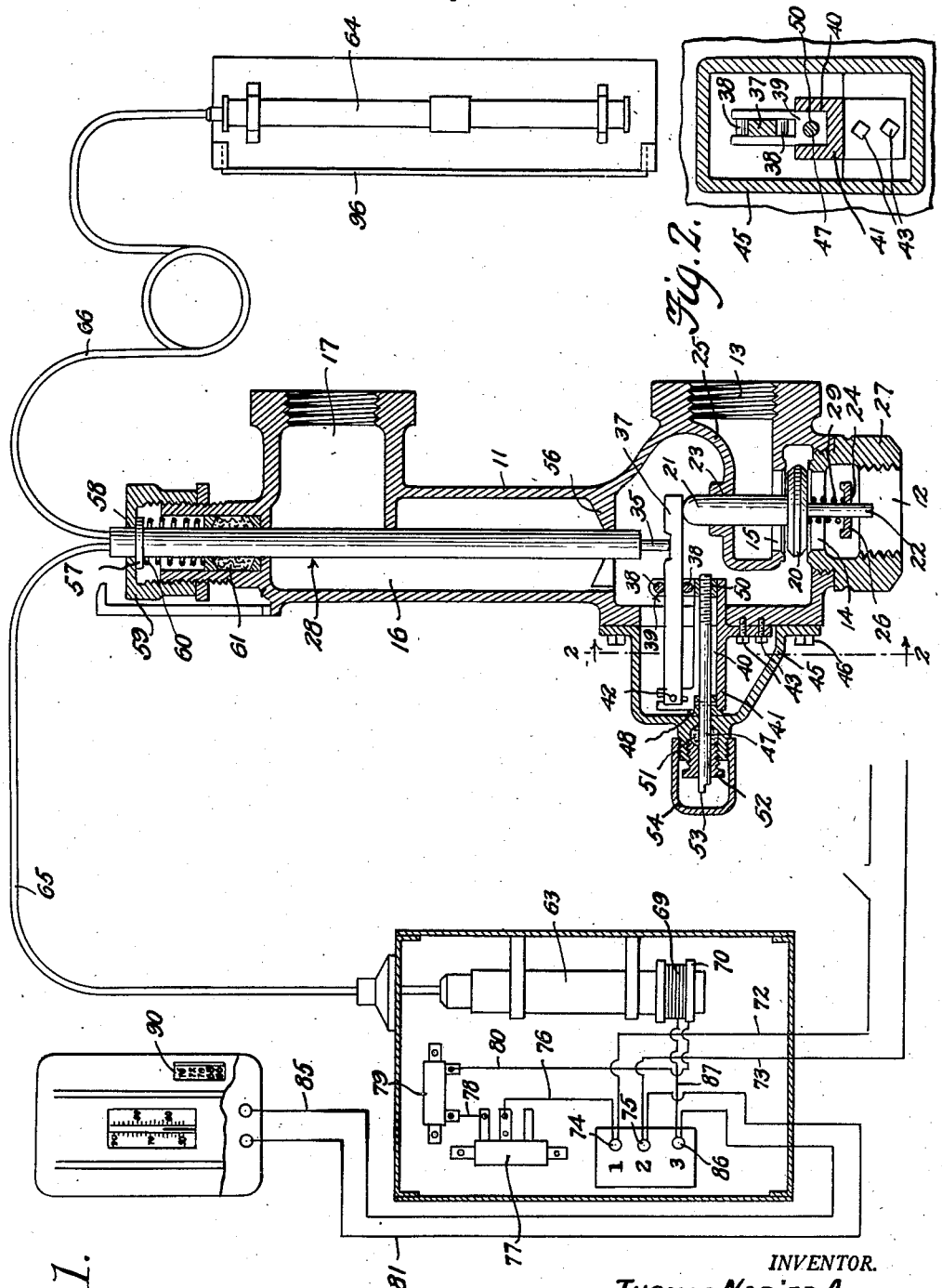
INVENTOR.
THOMAS NAPIER ADLAM
BY
Clark & Ott
ATTORNEYS Aug. 8, 1944.    T. N. ADLAM    2,355,043
THERMOSTATICALLY CONTROLLED VALVE
Filed April 13, 1942    2 Sheets-Sheet 2
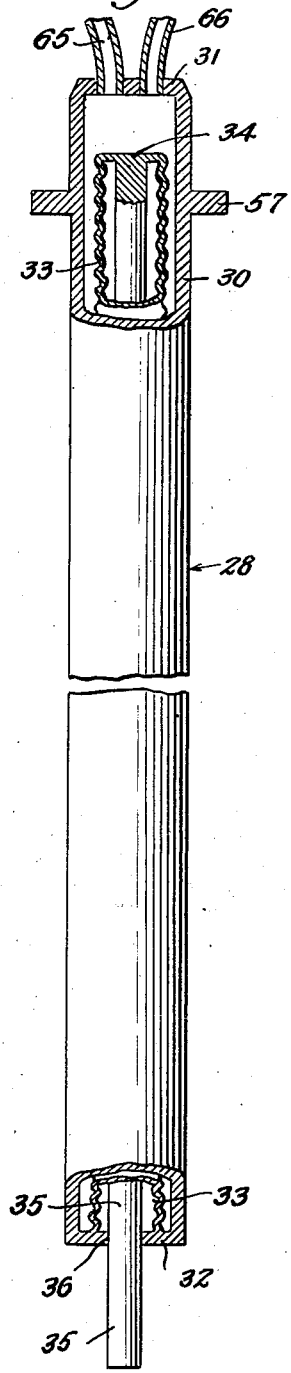
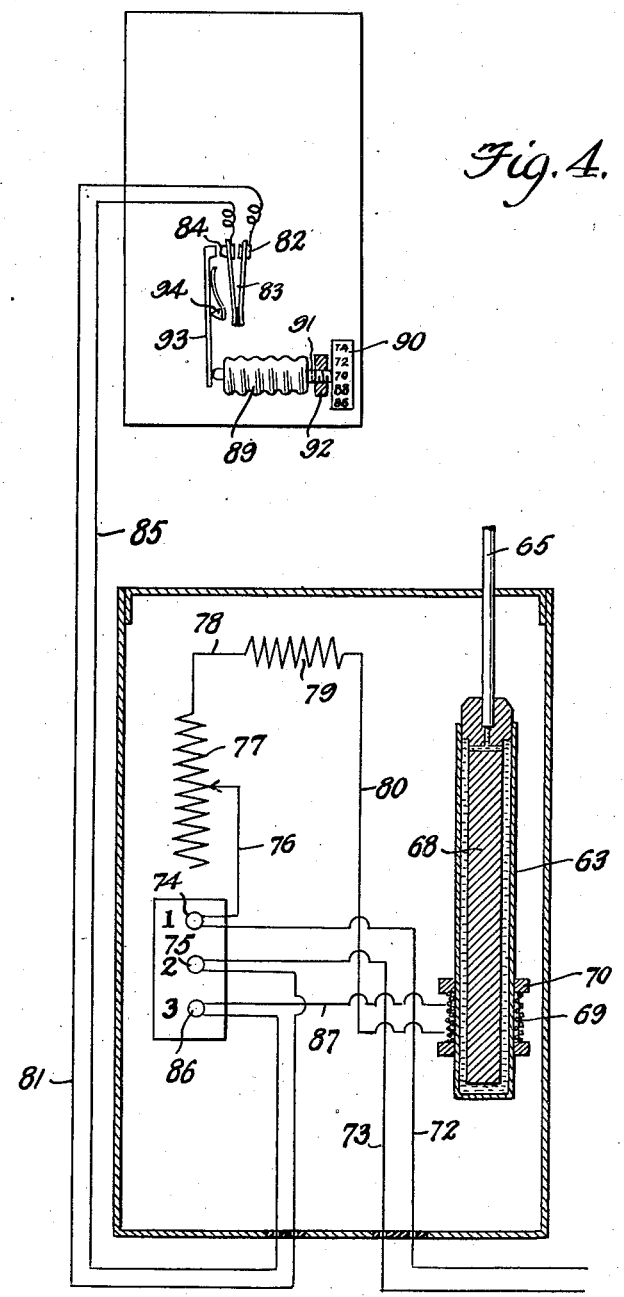
INVENTOR.
THOMAS NAPIER ADLAM
BY
Clarke Ott
ATTORNEYS Patented Aug. 8, 1944

2,355,043

UNITED STATES PATENT OFFICE 2,355,043

THERMOSTATICALLY CONTROLLED VALVE

Thomas Napier Adlam, West Orange, N. J., assignor to Sarco Company, Inc., New York, N. Y., a corporation of New York Application April 13, 1942, Serial No. 438,747

2 Claims. (Cl. 236—91)

This invention relates to automatic means for controlling the temperature of a heat exchange medium supplied to a heat exchanger in accordance with temperature requirements by regulating the flow of the medium to the exchanger from two sources, one normally above and the other normally below the temperature of the medium in the exchanger.

The invention comprehends means for controlling the temperature of a heat exchange medium to the exchanger by proportioning and blending relative amounts of the medium from two sources, one normally above and the other normally below the temperature of the medium in the exchanger or from either one of said sources in accordance with requirements for maintaining a predetermined temperature and which means is automatically actuated by thermostatic means responsive both to outside and inside temperature conditions. The means for controlling the temperature of the medium flowing to the exchanger includes a valve controlled by the thermostatic means which acts upon the valve stem to vary the port openings to proportion the relative amounts of the medium from said sources and which thermostatic means is actuated by a thermo-sensitive fluid in communication through conduits with terminal chambers, one located outside the enclosure containing the exchanger and subject to outside temperature conditions and the other located within said enclosure and subject to temperature conditions therein, the thermo-sensitive fluid in said terminal chambers also being in communication with each other whereby change of pressure in either one of said chambers is transmitted to the other and to the valve stem.

The invention is applicable to hot water heating systems for controlling the temperature of the water supplied to the radiators by regulating the flow of hot water thereto by means of said automatically controlled valve which functions to admit hot water either from the boiler or from the return main or which proportions and blends the water from said sources in accordance with temperature requirements. In such installations one of the terminal chambers of the thermostatic means is located outside the building so that the thermo-sensitive fluid therein is subject to outside temperature conditions, while the other terminal chamber is located within the building whereby the thermo-sensitive fluid in said terminal chamber is subject to inside temperature conditions and is responsive to the requirement therein and which function to vary the pressure of the thermo-sensitive fluid on the valve to provide a more constant temperature within the building under all temperature conditions within and without the building and a more efficient operation of the heating system.

The invention further comprehends a valve of the indicated character provided with a thermostatically actuated piston for controlling the movement of a valve element to proportion the relative amounts of water admitted to the valve from two hot water supplies, one normally at a higher temperature than the other together with means for varying the extent of movement of the valve element in relation to the extent of movement of the piston.

The invention further resides in a room thermostat adapted to be set for actuation at any desired predetermined room temperature to close and open an electrical circuit containing means for heating the room terminal chamber to thereby rapidly heat the thermo-sensitive fluid therein to a temperature above that of the room so as to effect by the expansion of the fluid a rapid actuation of the valve in response to temperature requirements within the room.

With the foregoing and other objects in view, reference is now made to the following specification and accompanying drawings in which there is illustrated the preferred form of the invention.

In the drawings:

Fig. 1 is a diagrammatic view of a valve and thermostat means constructed in accordance with the invention and illustrating the valve being shown in longitudinal section.

Fig. 2 is a detail transverse sectional view taken approximately on the line 2—2 of Fig. 1.

Fig. 3 is an enlarged side elevation of the thermostatic element located within the valve and illustrating the opposite ends thereof broken away and shown in section.

Fig. 4 is an enlarged diagrammatic view illustrating the room thermostat connected with electric means for heating the inside terminal chamber which is shown in section.

Referring to the drawings by characters of reference, the valve for controlling the temperature of hot water supplied to a heat exchanger includes a valve body 11 having inlets 12 and 13 adapted for connection with two sources of supply such as the hot water main from a heating unit and the return main thereto, the water in the latter being at a lower temperature than the water from the heating unit.

The inlets 12 and 13 have communication with in the body 11 through aligned valve ports 14 and 15 with a mixing chamber 16 centrally offset with reference to said ports and provided with a mixed water outlet 17 leading from the chamber and adapted for connection with piping to the heat exchanger. The valve ports 14 and 15 have confronting valve seats 18 and 19 and disposed therebetween for movement towards and away from said seats is a double faced valve disk 20 having oppositely projecting valve stems 21 and 22 slidably mounted respectively in guide openings 23 and 24 in the partition wall 25 of the body 11 and in the spider 26 of a nipple 27 threadedly engaged in an opening in the body 11 and defining the inlet 12.

The admission of water through said inlets is automatically regulated by means of a thermostatic means which functions to move the valve disk away from the valve port 15 and towards the valve port 14 for controlling the relative proportions of water admitted to the mixing chamber through said inlets, the valve disk being moved in the opposite direction by a coiled expansion spring 29 surrounding the valve stem 22 and interposed between the disk 20 and the spider 26.

The thermostatic means includes a thermostatic element 28 comprising a tubular shell 30 provided with heads 31 and 32 at its opposite ends, the latter having secured thereto an extensible and collapsible sealing tube 33 extending longitudinally within the shell 30 and which has its free end closed by a piston head 34 to which is secured a piston 35 having its free end protruding through an opening 36 in the head 32 of the shell. The shell 30 is centrally disposed within the mixing chamber 16 and the sealing tube 33 is centrally arranged within the shell 30 in spaced relation to the wall thereof so as to dispose the piston 35 in offset relation to the axis of the valve disk 20 and which shell contains a thermo-sensitive fluid acting upon the piston head 34 for effecting by increase of pressure in said fluid due to expansion thereof movement of the piston 35 towards the valve disk.

In order to provide means for varying the extent of movement of the valve disk 20 in relation to the movement of the piston 35, a lever 37 is provided which is fulcrumed intermediate its length between bearing pins 38 carried by a bifurcated block 39 to dispose the inner end portion of the lever between the piston 35 and valve stem 21 with the piston and valve stem engaging opposite sides thereof at longitudinally spaced points. The block 39 is slidable longitudinally of the lever in a guide groove 40 of a bracket 41 for varying the fulcrum point thereof and the distances between the fulcrum point and the points of engagement of the piston 35 and the valve stem 21 with the lever. The lever 37 is permitted to rock but is retained against axial movement by a pin 42 engaging a slotted portion of the bracket 41.

The bracket 41 is secured by bolts 43 to the valve body 11 adjacent the opening 44 in the side wall thereof, the inner angulated portion of the bracket protruding into the casing through the said opening, while the opposite portion thereof extends outwardly therefrom to thereby dispose the groove 40 perpendicular to the axes of the piston 35 and valve disk 21 and the protruding portions of the bracket 41 and lever 37 being housed by a casing section 45 which is secured to the valve body 11 by bolts 46 in surrounding relation with the opening 44.

The block 39 is moved in the groove 40 towards and away from the piston 35 and valve stem 21 by means of a screw 47 provided with a collar 48 which is disposed between the outer end of the bracket 41 and the inner face of the casing section 45 to swivelly mount the screw for rotation while held against axial movement. The threaded inner end portion of the screw extends longitudinally of and in spaced relation to the wall of the groove 40 and engages the threaded opening 50 in the block 39. The outer end of the screw 47 protrudes outwardly through a packing gland 51 and screw plug 52 with its protruding end provided with a milled head 53 for engagement by a tool for swivelly turning the screw, the head 53 being covered by a removable screw cap 54.

The thermostatic element 28 is mounted for guided sliding movement towards and away from the lever 37 and is held in spaced relation with the wall of the mixing chamber 16 by circumferentially spaced radially arranged lugs 56 which engage the tubular shell 30 adjacent the inner end thereof, while the opposite end portion of said shell is provided with a collar 57 and has its outer end protruding through an opening 58 in a screw cap 59 which is seated on the collar 57 and engages the threaded end of the valve body 11 for selectively adjusting the thermostatic element 28 to actuate the valve disk 20 at any desired predetermined temperature. A coiled expansion spring 60 surrounds the shell 30 and is interposed between a packing gland 61 and the collar 57 for maintaining the collar in engagement with the screw cap 59.

The thermostatic means also includes two bulbs 63 and 64 defining terminal chambers therein which are in communication with the fluid chamber within the tubular shell 30 by conduits 65 and 66 having a fine bore and connected to the ends of the bulbs 63 and 64 respectively and to the head 31 of the tubular shell. The bulb 63 is designed to be located within the enclosure containing the exchanger and subject to the temperature conditions within the enclosure, while the bulb 64 is designed to be located outside the said enclosure and subject to outside temperature conditions and said bulbs and conduits 65 and 66 are filled with the thermo-sensitive fluid which acts upon the piston 35 to move the valve disk 20. The terminal chambers within the bulbs 63 and 64 being in communication with each other through the conduit 65 and 66 and with the fluid chamber in the tubular shell, any change of pressure in the fluid due to change in temperature within the enclosure or outside thereof, or due to the temperature of the water in the mixing chamber 16 causing the fluid in the tubular shell 30 and in the terminal chambers in the bulbs 63 and 64 to expand or contract will be transmitted to the piston 35 and to the valve disk 20.

In order to provide means for effecting a rapid actuation of the valve disk 20 when the temperature within the enclosure rises above a predetermined degree, the bulb 63 is provided with a plug 68 extending longitudinally thereof and which is spaced from the wall of the bulb to provide a thin film of the thermo-sensitive fluid surrounding the plug and between the same and the wall of the bulb. The bulb 63 is also provided with a heating coil 69 wound upon a spool 70 surrounding the bulb adjacent the free end thereof and which heating coil is adapted to heat the fluid in the said bulb to thereby cause an increased expansion of pressure therein which is transmitted to the piston 35 to thereby move the valve disk 20 towards the hot water port and away from the return water port which results in admitting to the mixing chamber and thence to the exchanger a greater proportion of water from the return main in relation to the hot water from the boiler or the closing entirely of the hot water port and the recirculating of the return water only through the exchanger.

The heating coil 69 is connected in an electric circuit with a source of current supply by conductor wires 72 and 73 which are respectively connected to terminal posts 74 and 75, the conductor wire 72 being connected by the conductor wire 76 to a variable resistance 77 and by a conductor wire 78 to a fixed resistance 79 and thence by a conductor wire 80 to one side of the heating coil 69. The conductor wire 73 from the post 75 is connected by means of a conductor wire 81 to one of the leads 82 of a make and break spring contact switch 83, the opposite lead 84 thereof being connected by a conductor wire 85 to a terminal post 86 and from thence by a conductor wire 87 to the opposite side of the coil 69 to thereby place in series with the coil the variable resistance 77, the fixed resistance 79 and the make and break contact switch 83.

The switch 83 is actuated to close the contacts 82 and 84 thereof and thereby close the circuit to the coil 69 by an expansible and contractible bellows 89 which is filled with a thermo-sensitive fluid and has connected thereto by a screw shank 90 a dial 91 provided with temperature indicating graduations and indicia and which shank threadedly engaging a fixed post 92 for adjustment of the bellows towards and away from a lever 93 for effecting actuation of the switch at a predetermined temperature.

The lever 93 is mounted for rocking movement on a fixed fulcrum 94 intermediate its length so as to dispose one end of the lever in the path of movement of the bellows 89 and the opposite end of the lever in position to engage the contact 84 to thereby close the switch upon expansion of the fluid in the bellows 89, the switch 83 being normally maintained in open relation by the outward tension of the spring leads thereof.

In operation in a heating system the outside bulb 64 being subject to outside temperature conditions, a rise in outside temperature increases the pressure of the fluid in the bulb which is transmitted to the piston head 34 to thereby move the piston 35 to force the valve disk 20 away from the port 15 and towards the port 14. This admits to the mixing chamber 16 of the valve and thence to the heat exchanger, a greater proportion of water from the return main in relation to the hotter water from the water heater so as to lower the temperature of the water passing through the exchanger. A drop in the outside temperature produces a decrease in the pressure on the piston head 34 permitting the spring 29 to move the valve disk 20 away from the port 14 and towards the port 15 so as to admit to the mixing chamber 16 a greater proportion of hot water from the water heater in relation to the amount of water admitted from the return main which results in an increase of the temperature of the water flowing to the heat exchanger.

Since there is a lag between changes in outside temperature conditions and the temperature in the building, control of the valve by the outside bulb 64 may result in the temperature in the building becoming too warm. The bulb 63 is, therefore, provided to control the valve so as to ease off excessive changes in temperature in the building and maintain a constant temperature under substantially all outside temperature conditions. For instance, a sudden drop in the outside temperature results in the movement of the valve disk so as to admit to the radiator a relatively greater proportion of hot water from the boiler which may result in overheating of the building due to the fact that the heat loss therefrom is not as rapid as the fall in the outside temperature. If a rise in temperature is produced within the building above the predetermined setting of the dial 90, expansion of the fluid in the bellows 89 effects the closing of the switch 83 and thereby the heating of the coil 69. This produces an increase in pressure in the bulb 63 which is transmitted to the piston head 34 to thereby move the valve disk 20 to admit to the exchanger a greater proportion of water from the return main in relation to the hotter water from the water heater or a complete closing of the hot water port and the recirculation of the return water only to the exchanger to thereby provide a check upon the outside control and a more even temperature in the building and consequently a more efficient operation of the heating system.

The conductor wire 76 is adjustably connected with the resistance 77 in order to vary the resistance in circuit with the coil 69 and thereby regulate the heat supplied to the bulb 63 in accordance with the requirement of the particular installation.

The bulb 64 is shielded by a reflector 96 which is spaced therefrom and is open at its ends to permit circulation of air about the bulb and which shield reflects and shields the bulb from the rays of the sun.

What is claimed is:

1. In a thermostatically controlled valve having inlet ports for admitting heat exchange medium at relatively different temperatures respectively and having a mixing chamber in communication with said ports and provided with a discharge outlet, a reciprocatory valve element disposed between and mounted for movement in opposite directions towards and away from said ports respectively, a thermostatic element disposed in said chamber and having a piston mounted therein for moving the valve element in one direction, an expansion spring engaging said valve element for moving the same in the opposite direction, a lever mounted for rocking movement and engaged by the piston and valve element on opposite sides thereof at longitudinally spaced points, means for varying the fulcrum point of said lever longitudinally thereof so as to vary the extent of movement of the valve element in relation to the movement of the piston, control bulbs defining terminal chambers and conduits connecting said bulbs to said thermostatic element for establishing communication between the terminal chambers and with the interior of the thermostatic element, said thermostatic element and said bulbs containing a thermo-sensitive fluid for controlling the movement of the piston and valve element by expansion and contraction of the fluid due to temperature changes occurring at the location of the bulbs and in the mixed medium in the mixing chamber, a heating element for one of said bulbs, an electric switch and a thermostat adapted to be set for actuation of said switch at a predetermined temperature, and means electrically connecting said switch to said heating element for heating the fluid within the said last mentioned bulb when the temperature surrounding said thermostat exceeds the predetermined degree set on said thermostat.

2. In an automatic means for controlling the temperature of a heat exchange medium in a heat exchange system, a mixing valve having a discharge outlet and inlet ports for admitting heat exchange medium at relatively different temperatures and having a thermostatically controlled piston and a valve element for controlling the flow of the medium through said inlet ports, a lever mounted for rocking movement and against which the piston and valve element are impinged at one end and on opposite sides thereof at longitudinally spaced points, means for varying the fulcrum point of said lever so as to vary the extent of movement of the valve element in relation to the movement of the piston, thermocontrol bulbs connected with the thermostat of said thermostatically controlled piston for controlling the movement of said piston and valve element in accordance with temperature changes occurring at the location of said bulbs, a heating element for one of said bulbs, an electric switch and a thermostat adapted to be set for actuation of said switch at a predetermined temperature, and means electrically connecting said switch to said heating element for heating said last mentioned bulb when the temperature surrounding said thermostat exceeds the predetermined degree set on said thermostat.

THOMAS NAPIER ADLAM.